(12) United States Patent
Kimlinger et al.

(10) Patent No.: US 6,360,952 B1
(45) Date of Patent: Mar. 26, 2002

(54) CARD ACCESS SYSTEM SUPPORTING MULTIPLE CARDS AND CARD READERS

(75) Inventors: Paul J. Kimlinger, Maplewood; Thomas J. Kimlinger, Fridley, both of MN (US)

(73) Assignee: Digital Privacy, Inc., St. Louis Park, MN (US)

( * ) Notice: Subject to any disclaimer, the term of this patent is extended or adjusted under 35 U.S.C. 154(b) by 0 days.

(21) Appl. No.: 09/087,032

(22) Filed: May 29, 1998

(51) Int. Cl.[7] .............................................. G06K 13/06
(52) U.S. Cl. ...................................... 235/492; 235/486
(58) Field of Search ................................ 235/235, 492, 235/487, 486, 382, 493, 441; 705/35–44

(56) References Cited

U.S. PATENT DOCUMENTS

| | | | | |
|---|---|---|---|---|
| 5,332,889 A | * | 7/1994 | Lundstrom et al. | 235/380 |
| 5,378,884 A | * | 1/1995 | Lunstrom et al. | 235/441 |
| 5,594,233 A | * | 1/1997 | Kenneth et al. | 235/492 |
| 5,613,089 A | * | 3/1997 | Hornbuckle | 395/491 |
| 5,614,707 A | * | 3/1997 | Lunstrom et al. | 235/479 |
| 5,651,116 A | * | 7/1997 | Le Roux | 235/492 |
| 5,679,945 A | * | 10/1997 | Renner et al. | 235/492 |
| 5,798,507 A | * | 8/1998 | Kawagishi et al. | 235/380 |

FOREIGN PATENT DOCUMENTS

| | | | |
|---|---|---|---|
| JP | 59108130 A | * | 12/1982 |
| JP | 01310438 A | * | 12/1989 |

\* cited by examiner

*Primary Examiner*—Thien M. Le
(74) *Attorney, Agent, or Firm*—Fredrikson & Byron, P.A.

(57) ABSTRACT

A card access system providing support for multiple card readers and cards. The system providing a common programming interface for applications to perform a generic card access instruction set. The system automatically interpreting and translating the generic card access instruction set into native commands for a particular card reader and a particular card. The cards including integrated circuit or "smart" cards.

5 Claims, 11 Drawing Sheets

CARD ACCESS SYSTEM SUPPORTING MULTIPLE CARDS AND CARD READERS

FIELD OF THE INVENTION

The present invention relates generally to a card access system which supports multiple cards and card readers and in particular to a integrated circuit or "smart" card access system for supporting multiple models and makes of integrated circuit or "smart" cards and readers.

BACKGROUND OF THE INVENTION

The use of integrated circuit cards or "smart cards" is growing in popularity worldwide. A number of smart card technologies have been introduced for a number of purposes including banking, controlled access, and identification. A variety of different card manufacturers have produced multiple models of smart cards and smart card readers which generally require different protocols for supporting communications between a computer and the card and card reader. Specialized programming may be required to perform commands between an application executing on a computer and the smart card and smart card reader. A change in the software is likely to be required if the smart card and/or smart card reader are replaced with a different model or make.

Therefore, there is a need in the art for a system for supporting multiple cards and card readers. The system should support different protocols to enable changes in smart card and smart card reader hardware without requiring rewriting of application software.

SUMMARY OF THE INVENTION

A card access system including a card reader module programmed to support card accesses between an application and a selected card reader of a plurality of card readers, the card reader module programmed upon receiving an instruction identifying the selected card reader. The card access system providing support for a number of different makes and models of card readers. The card system also providing a card module which provides support for a number of different makes and models of cards, including integrated circuit cards or "smart" cards. The card access system providing a consistent access interface for receiving card access commands from an application. Additional aspects of the system include port selection for multiple input and output ports and an optional generic card access command set so that applications designed to interface with the card access system need not be rewritten each time a make or model of card reader or card is substituted or added to the system.

Other aspects of the invention are described in detail in the Detailed Description, below. This summary is not to be taken in a limiting or exhaustive sense, and the scope of the present invention is defined by the appended claims and equivalents thereof.

BRIEF DESCRIPTION OF THE DRAWINGS

In the drawings, where like numerals describe like components throughout the several views.

DETAILED DESCRIPTION OF THE PREFERRED EMBODIMENTS

In the following detailed description of the preferred embodiments, references are made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. The following detailed description is, therefore, not to be taken in a limiting sense, and the scope of the present invention is defined by the appended claims and equivalents thereof.

The present card access system is described here in computer applications, however, such description is not intended in an exclusive or limiting sense and is intended to demonstrate the card access system and some of its possible applications. Other embodiments and applications of the card access system are possible without departing from the present invention. For example, the card access system may be used in any application supporting a plurality of cards or card readers. For instance, the card access system may be used in applications involving personal identification systems, such as a banking kiosk. The card access system may also be used for security and access control in general. Several other embodiments, however, are possible without departing from scope of the present invention. Furthermore, the description refers to "smart" cards, however, the present access system includes applications using integrated circuit cards in general. Other cards, makes, and models may be substituted herein without departing from the scope of the present invention.

Figure 1:
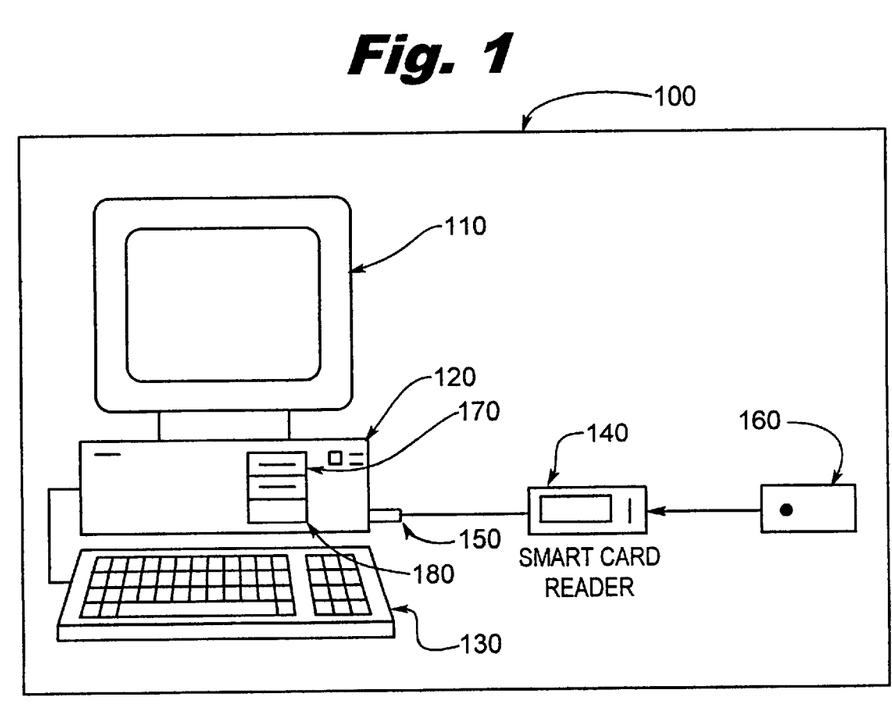
FIG. 1 is a block diagram of a computer system representing one environment in which the present system may be used.

FIG. 1 shows a computer system 100, which is one environment in which the present card access system may be practiced. The computer 100 has a monitor 110, chassis 120, hard drive 180, floppy drive 170, input/output port 150, keyboard 130 and smart card reader 140. Also included is a smart card 160 which is inserted into smart card reader 140 for a variety of applications. In one embodiment, input/output port 150 is an RS-232 port. In an alternate embodiment, port 150 is a PCMCIA port. Other types of input/output ports are possible without departing from the scope of the present invention, and the examples given herein are intended to be demonstrative and not exclusive or limiting. In alternate embodiments, the smart card reader 140 is integrated within the computer chassis 120.

Computer system 100 executes applications which access the smart card 160 via card reader 140. In one embodiment, the present card access system is installed in computer system 100 and provides an interface between software applications executing on computer system 100 and smart card 160 via card reader 140. In one embodiment, the card access system provides a programming interface featuring generic card commands which may be invoked by the applications executing on computer system 100. In this embodiment, the smart card access system automatically converts the generic commands into the specific protocol required by the particular card reader 140 and card 160.

Figure 2:
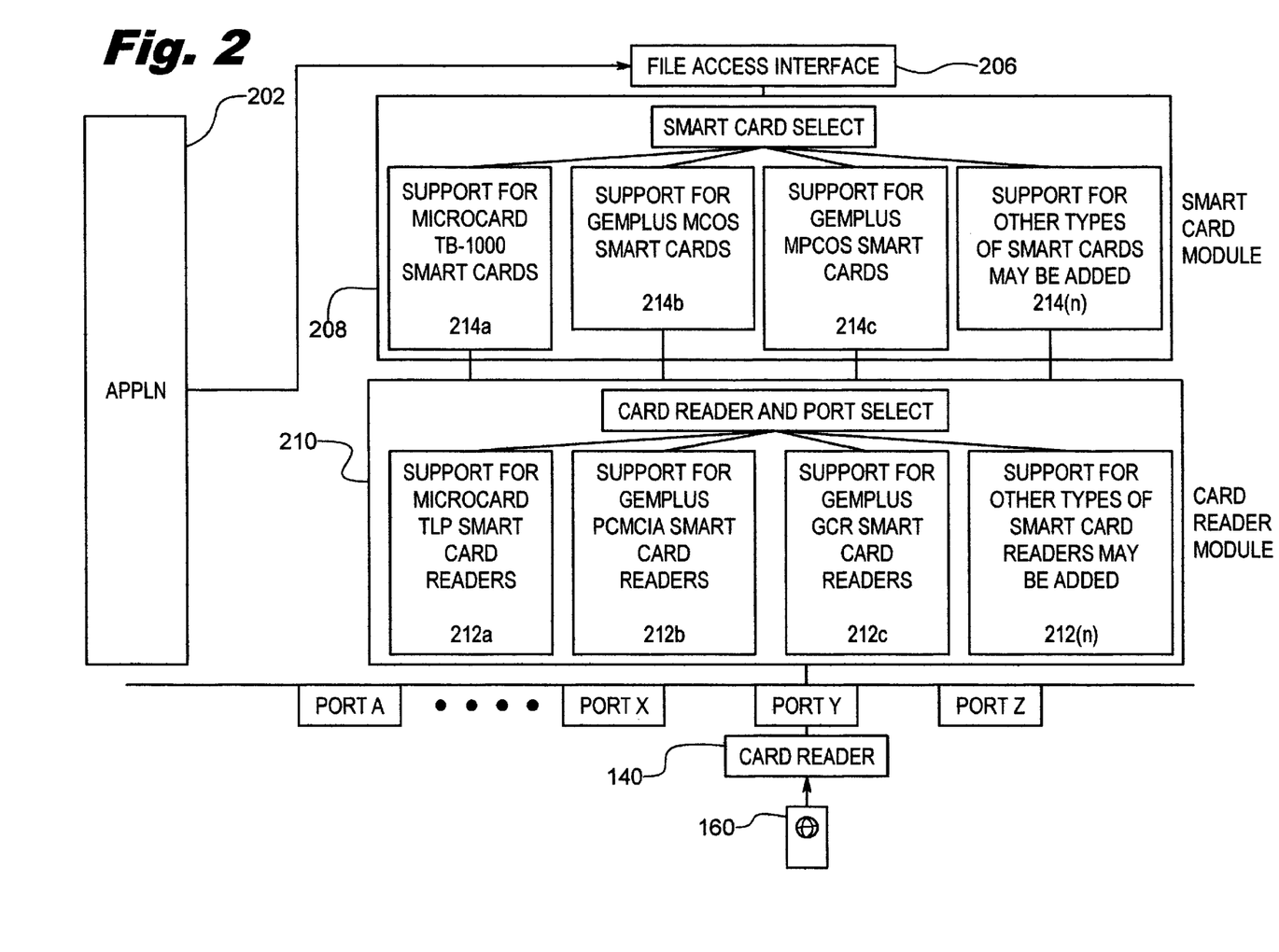
FIG. 2 shows a block diagram of a software application performing card reader and card communications according to one embodiment of the present system.
Figure 3:
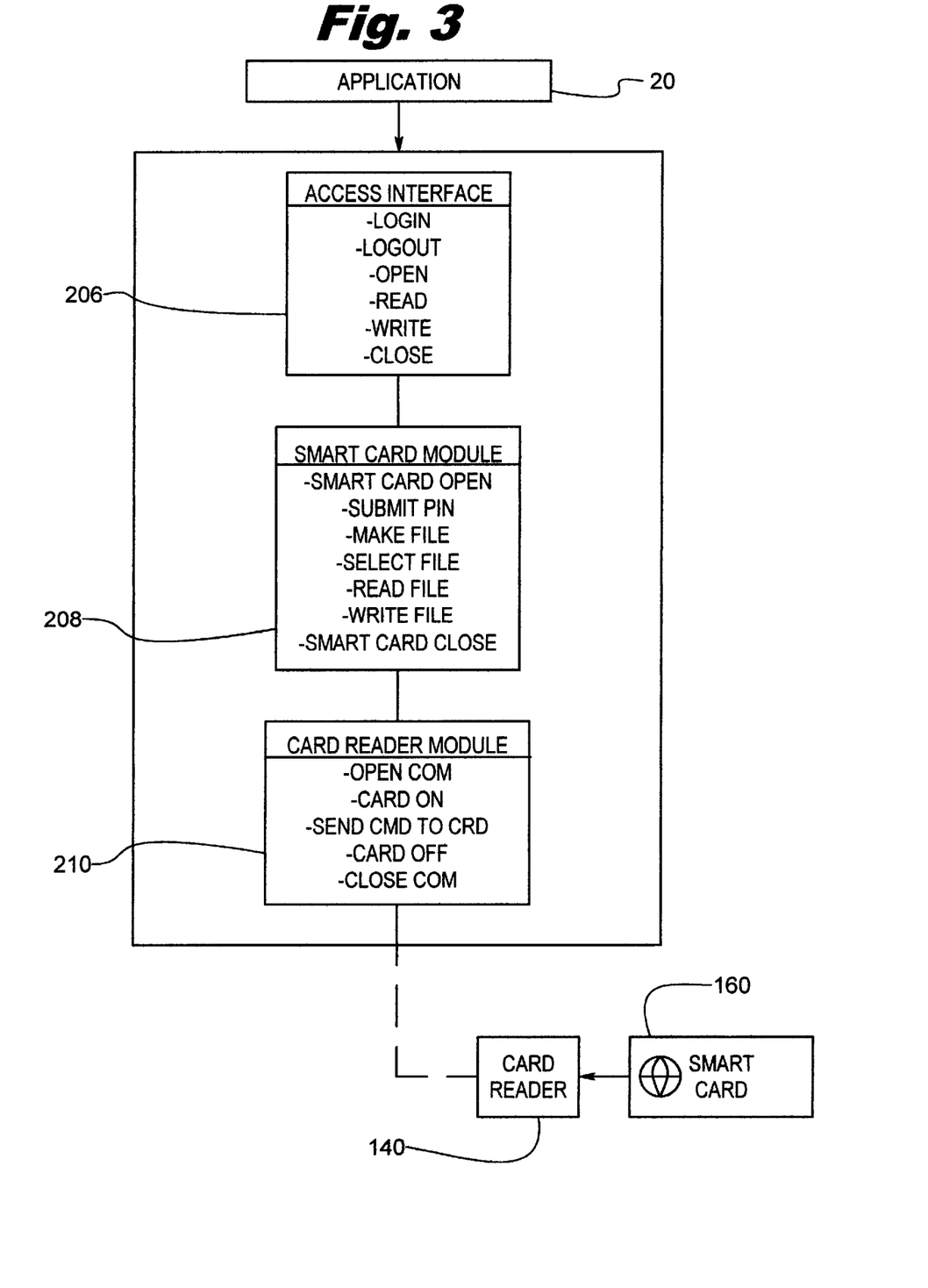
FIG. 3 is a block diagram showing instructions at various levels in the card access system according to one embodiment of the present system.

FIG. 2 illustrates a card access system according to one embodiment of the present system. Software application 202 is programmed to access smart card 160 via card reader 140 by issuing generic card commands to the file access interface 206 of smart card module 208. Smart card module 208 provides support of a plurality of brands and models of smart card 160. Card reader module 210 provides support of a plurality of brands and models of card reader 206. Various embodiments will be described which are intended to demonstrate the present smart card access system, and other embodiments exist which do not depart from the scope of the present smart card access system. The embodiments described herein are not intended as exclusive or limiting embodiments of the present inventions, and the scope of the inventions claimed herein are provided by the appended claims and equivalents thereto.

In one embodiment, card reader module 210 is configured to support a plurality of card readers 140 to provide programmable selection of support for different card readers 140. The plurality of card readers includes, but is not limited to, different brands and models of card readers 140. In one embodiment, card reader module 210 includes a number of card reader-specific drivers 212 to support the plurality of card readers 140. For example, if card reader 140 is a MICROCARD card reader, such as a MICROCARD Model TLP card reader, then the card reader 10 specific driver 212 associated with the MICROCARD Model TLP card reader (212a) is used to provide communications between card reader 140 and card reader module 210. Other card readers supported by card reader module 210 include, but are not limited to, GEMPLUS PCMCIA, GEMPLUS GCR, and CHERRY.

In one embodiment, the user of the application 202 is able to select the type of card reader 206 which will be used by the system by selecting a particular card reader brand and model from a predefined list. In one embodiment the user may define which port that the card reader 140 is connected to on the computer 200.

In this embodiment, smart card module 208 is programmable to support the particular brand and model of smart card 160 inserted into smart card reader 140. In one embodiment, a smart card identifier is returned during an answer to reset function after the smart card 160 is inserted into card reader 140 and powered on. In one embodiment the smart card identifier is a smart card code which identifies the brand and model of smart card according to a predetermined standard ISO 7816-3 Electronic Signals and Transmission Protocols. The smart card identifier is used to select a particular smart card-specific driver 214 which is used by smart card module 208 to provide access between application 202 and smart card 160. For example, if a GEMPLUS MCOS smart card is inserted into card reader 140, the smart card identifier for this particular card will be received and processed by smart card module 208. Upon detection of the smart card identifier in association with the GEMPLUS MCOS card, the GEMPLUS MCOS smart card-specific driver 214b will be selected for communications between application 202 and smart card 160.

The smart card module 208 will support a plurality of different brands and models of smart cards including, but not limited to, MICROCARD TB 1000, GEMPLUS COS, MCOS, MPCOS, MICROCARD Scot family, MICROCARD TB family and ORGA.

In one embodiment of the present system, the combination of smart card module 208 and card reader module 210 provides the flexibility to support multiple types of card readers and multiple types of smart cards 204 which may be combined provided the necessary smart card-specific driver and card reader-specific driver for each device. For example, a MICROCARD TLP card reader 140 may be used in conjunction with the GEMPLUS COS smart card 160 in order to provide seamless and automatic support of a plurality of different makes and models of smart cards and smart card readers. In such an embodiment, the software application is written to invoke the generic commands and need not be rewritten should the make or model of card 160 or card reader 140 change. Furthermore, recompilation and relinking of the smart card modules is not required.

It will be appreciated by one of skill in the art upon reading and understanding the present description that the present system may be embodied in hardware, software, firmware, and combinations thereof. For purposes of explanation, the present access system will be described in terms of software modules, however, it is understood that other embodiments exist which do not depart from the present invention. Furthermore, the software embodiments may be practiced in a nonmodular form without departing from the present system.

In one embodiment, the card access system incorporates a single application programming interface (API) which software applications can use to store and retrieve information from the smart card without rewriting software to accommodate various different protocols for cards and card readers. In one embodiment, the access control system employs a smart card module 208 and a card reader module 210. The smart card module 208 converts generic commands received at access interface 206 from the application 202 into smart card-specific commands designed to control individual makes and models of smart cards 160. The card reader module 210 interprets generic commands and formats card reader-specific commands to accommodate the protocols of different makes and models of smart card readers 140. In one embodiment, the application 202 is provided information regarding card reader 140 make and model and the particular hardware port to which the card reader 140 is connected. This information may be transferred to the application using a human graphical user interface. In this embodiment, the application does not need to be aware of the specific commands required to control particular smart card readers. However, the specification of make and model of the card reader 140 is used to select an appropriate driver 212 for a particular card reader.

In one embodiment, a particular type of smart card 160 is determined using an "answer to reset" instruction which is returned by a smart card 160 as it is powered up. The information returned from an "answer to reset" command includes identification of the make and model of the smart card 160 inserted in the card reader 140. Therefore, the present card access system automatically selects an appropriate driver 214 to support a particular smart card 160 make and model.

In one embodiment, an application 202 conducts communications with the card 160 and reader 140 by a login command followed by several generic read, write and card function commands, such as the commands described in the smart card module 208. The communications are completed upon a logout. In one embodiment, the communications are terminated upon loss of power to the system or interruption of normal commands.

CARD READER MODULE

One embodiment of the card reader module 210 supports the following generic commands:

Open Communications Port,

Close Communications Port,

Turn on Smart Card and Read Answer to Reset,

Turn off Smart Card,

Convert Answer to Reset to an Internal Format,

Write Data to Smart Card,

Read Data from Smart Card,

Read Response from Card, and

Convert Card Reader Errors to Internal Format.

Open Communications Port

In one embodiment, the system provides a "Open" function common to all makes and models of card readers. The caller of the Open function provides arguments that indicate the make and model of the smart card reader 140 along with the port to which the reader is attached. This information is used to select from a plurality of functions callout tables, the table appropriate for the make and model of the given card reader. All other calls into the card reader module 210 use the functions pointed to by the selected callout table so that the correct commands are supplied for the particular card reader 140.

Figure 4A:
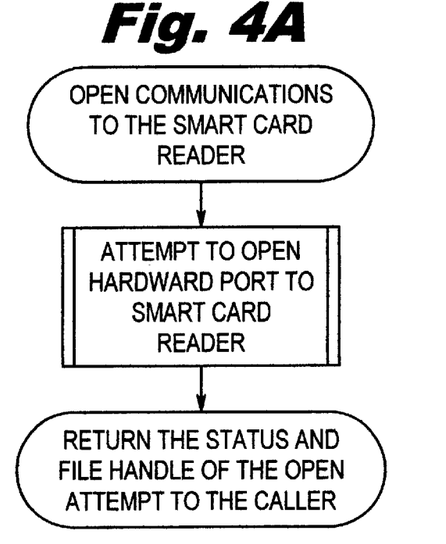
FIG. 4A is a flow diagram showing an open communications port function according to one embodiment of the present system.

Once the function table has been selected, the card-reader-specific "Open Communications Port" function is called, as shown in FIG. 4A. The reader-specific "Open Communications Port" function calls standard operating system functions to open a hardware communication channel to which the card reader 140 is connected. In one embodiment, the Operating System is MICROSOFT WINDOWS and the hardware port is a COM port. In another embodiment the port is a PCMCIA port, however, other operating systems and ports may be used without departing from the present system.

If the communications port was opened successfully, a "handle" is returned to the caller, otherwise an error code is returned to indicate the nature of the error. The handle contains the function table reference and state information used by other Card Reader module commands to direct and control the communications channel.

In one embodiment, the caller of the Open Communications Port command is smart card module's (208) "Smart Card Open" command, discussed below. In other embodiments, the caller may be specially programmed applications.

Close Communications Port

Figure 4B:
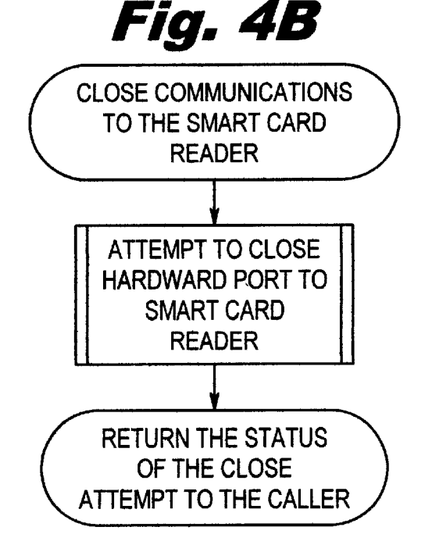
FIG. 4B is a flow diagram showing a closed communications port function according to one embodiment of the present system.

In one embodiment, the "Close Communications Port" function, shown in FIG. 4B, calls standard operating system functions to close the hardware communications channel that was opened by the "Open Communications Port" command. After the port is closed, all resources associated with the given communication channel (memory, etc.) are freed.

Turn on the Smart Card

Figure 4C:
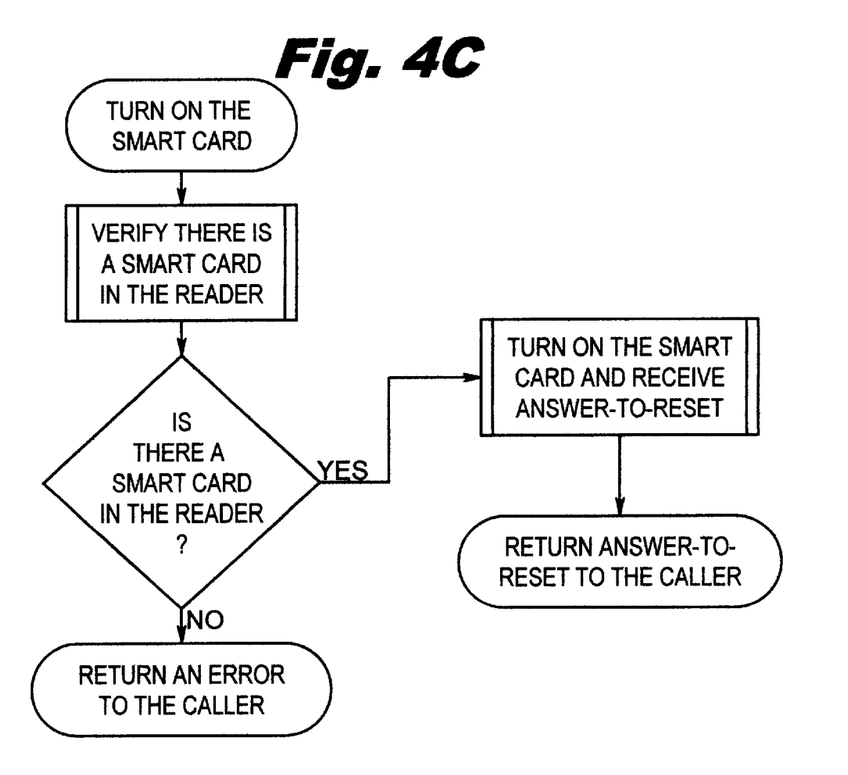
FIG. 4C is a flow diagram showing an activate smart card function according to one embodiment of the present system.

In one embodiment, the function to turn on the smart card 160 generates the appropriate command sequence to tell the smart card reader 140 to supply power to the smart card 160. One embodiment of a turn on smart card function is shown in FIG. 4C. In one example, the smart card reader 140 is a GEMPLUS GCR-200 and the following byte sequence is written to the COM port "60046E0000000A". Other smart card readers 140 and byte sequences are used to support multiple smart card readers 140.

When power is initially supplied to the smart card 160, it responds by returning a byte sequence defined in ISO Standard 7816. The Answer to Reset is converted to an internal format using the "Convert Answer to Reset" function, shown in FIG. 4E, that is passed back to the smart card module 208. The smart card module 208 uses the converted answer to reset to select the appropriate smart-card-specific function callout table.

Turn Off Smart Card

Figure 4D:
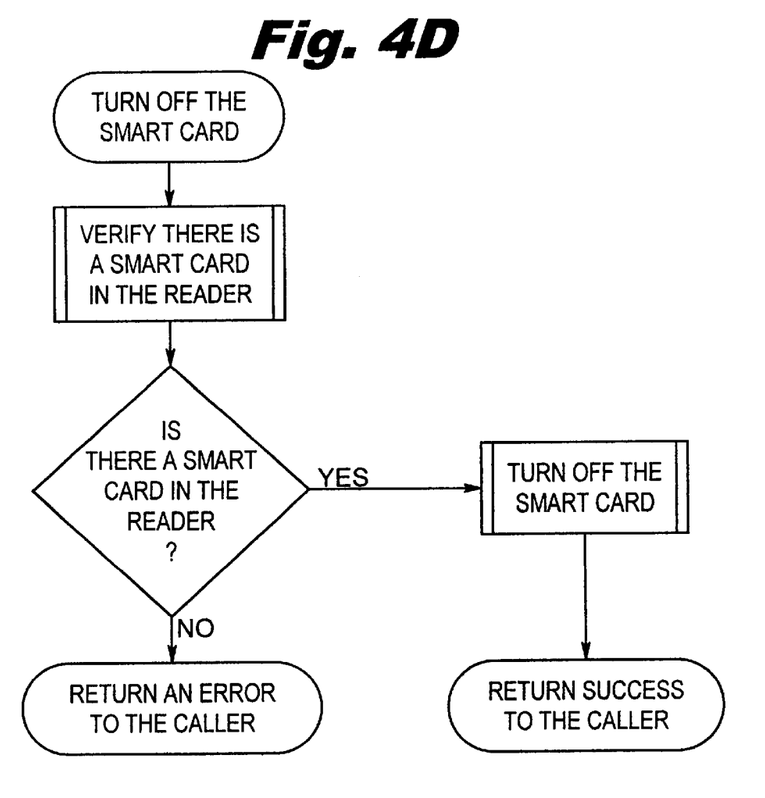
FIG. 4D is a flow diagram showing a deactivate smart card function according to one embodiment of the present system.
Figure 4E:
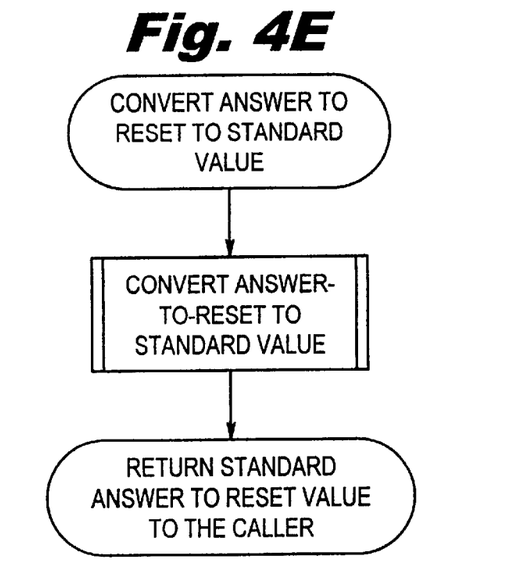
FIG. 4E is a flow diagram showing convert answer to reset to standard value function according to one embodiment of the present system.
Figure 4F:
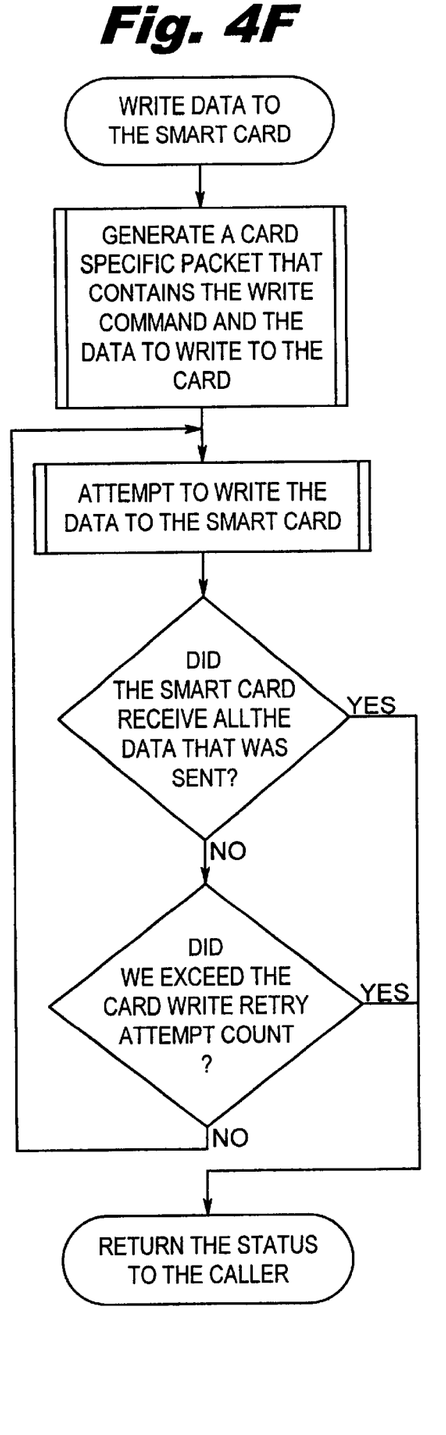
FIG. 4F is a flow diagram showing write data to smart card function according to one embodiment of the present system.
Figure 4G:
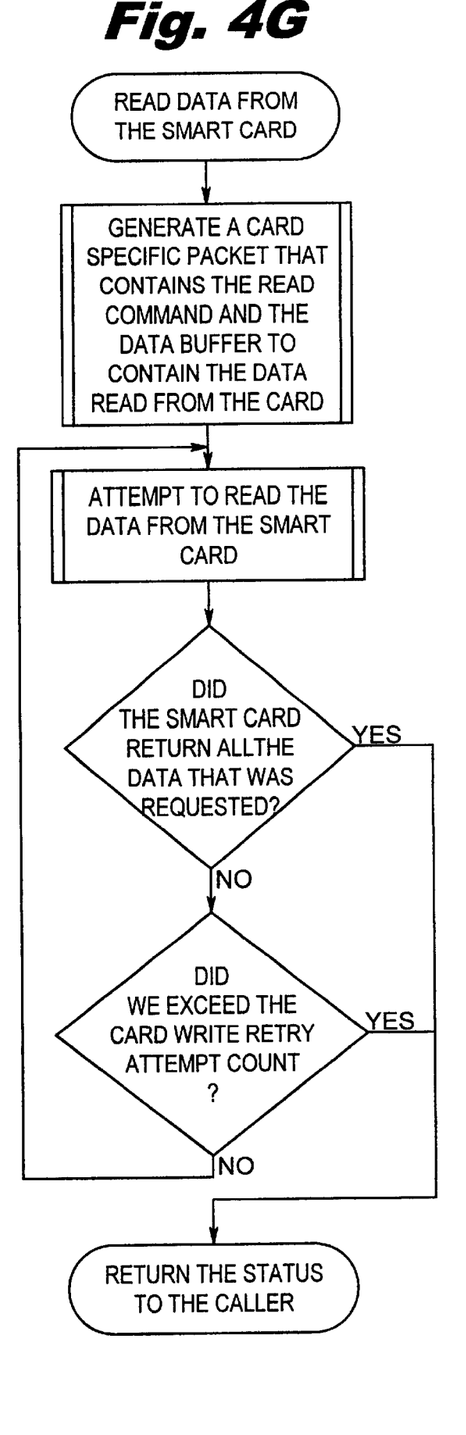
FIG. 4G is a flow diagram showing read data from smart card function according to one embodiment of the present system.

In one embodiment, the function to turn off the smart card 160 generates the appropriate command sequence to tell the smart card reader 140 to disconnect power from the smart card 160. In the example where the smart card reader is a GEMPLUS GCR-200 the following command sequence is written to the COM port: "60014D2C". One flow diagram of a turn off smart card function is shown in FIG. 4D.

Write Data to Smart Card

In one embodiment, the "Write Data" function is used to send commands to the smart card 160 that contain the standard 5-byte ISO command plus additional data. In this case, the card 160 responds with a 2-byte answer (only) that indicate the card's status. In one embodiment, the card reader module 210 does not interpret the command; it controls the card reader 140 so that the reader 140 will submit the command to the card 160 and receive the response.

In one example where the smart card reader 140 is a GCR-200 connected and the command sequence to issue a "write" command is:

"3630" <Length of Command+Data>"4441" <Command+Data+Checksum>"03"

Other readers 140 may require different command structures.

The Write Data to Smart Card command reads the response from the smart card and returns it to the calling smart card module function.

Read Data from Smart Card

In one embodiment, the "Read Data" function is used to send commands to the smart card 160 that contain the standard 5-byte ISO command. In this case, the card 160 responds with one (1) or more bytes of data plus two (2) bytes that indicate the card's status.

In one embodiment, the card reader module 210 does not interpret the command; it is only responsible for controlling the card reader 140 so that the reader 140 will submit the command to the card 160 and receive the response.

In one example, the smart card reader 140 is a GCR-200 connected to the COM port and the command sequence written to the COM port to issue a "read" command is:

"363030364442"+<Command>+<Checksum>+"03"

Figure 4H:
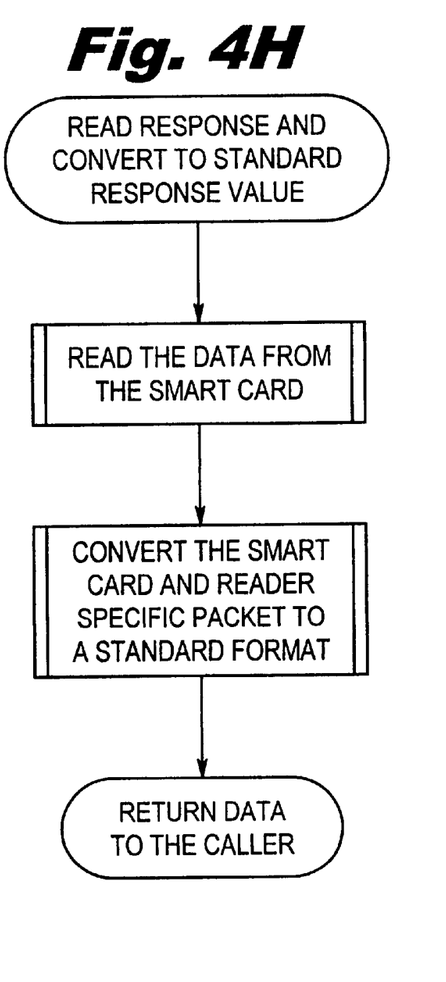
FIG. 4H is a flow diagram showing read response and convert to standard response value function according to one embodiment of the present system.

The Read Data function is responsible for reading the cards response via a "Read Response" function, one embodiment of which is shown in FIG. 4H, and returning the response to the caller. In one embodiment, the caller is a smart card module function attempting to send a command to the card.

Convert Card-Reader Specific Errors

Figure 4I:
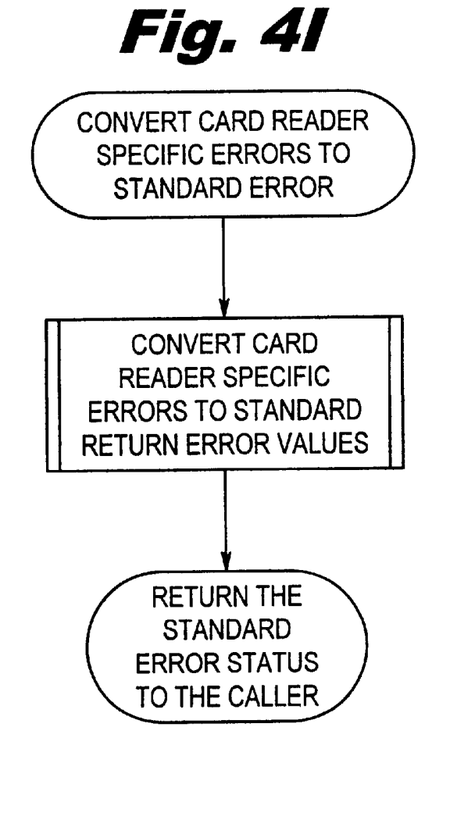
FIG. 4I is a flow diagram showing convert card reader specific error function according to one embodiment of the present system.

In the event the card reader 140 returns an error, every reader-specific driver 212 contains a function to convert the card reader error codes, which vary between makes and models of readers, into a common set of error codes, as demonstrated by FIG. 4I. For example, different readers may return different error codes "No Card in Reader."

Examples of Card Reader Modules and Card Reader-Specific Drivers

One embodiment of a card reader module 210 is provided in APPENDIX A. This card reader module is written in C and C++ programming languages. In this embodiment, the card reader module 210 invokes card reader-specific drivers 212, such as provided in APPENDIX B, which is for a GEMPLUS GCR 200 card reader. This particular card reader-specific driver 212 is specially programmed to translate generic commands received by the access interface 206 into native commands for the GEMPLUS GCR 200 card reader. To support other card readers 140, other drivers 212 are written to translate the generic commands into native instructions. For example, APPENDIX E is an example of a reader-specific driver 212 for a CHERRY card reader 140. In alternate embodiments, additional drivers 212 are added to the system to support additional card readers 140.

Other modules may be used to support the communications. The GCR 200 reader-specific driver 212 calls routines for input and output to the card reader 140, such as the corn module UART32.CPP as shown in APPENDIX G.

Those skilled in the art who read and understand the present system will understand that other embodiments using different languages and performing different functions exist which do not depart from the present system. And the embodiments and examples given herein are intended to demonstrate the invention and not in and exhaustive or exclusive sense.

SMART CARD MODULE

Different makes and models of smart cards employ different mechanisms to protect data stored on the card. Smart cards may use one or more access codes that can be associated with smart card file activities such as reading and writing. One embodiment of the present system utilizes the access mechanisms of the card such that a file can be created in such a way as to allow the application to associate two actions—reading and writing—of a file with one of a predetermined number of access codes. In one embodiment, the predetermined number of access codes is four (4) access codes. However, the predetermined number of access codes may vary without departing from the present system. In the present system, any combination of access codes, files and actions is allowed. For example, a file could be created which requires access code 2 to read the file and access code 1 to write the file.

In one embodiment, the smart card is a GEMPLUS COS card, which allows for 8 access codes. In this embodiment, only 4 access codes are utilized and the rest are ignored. The smart card operating system provides the security system to control the actions on files.

In one embodiment, the four (4) access codes are "Session Key"+ "smKEY_SK1, smKEY_SK2, and smKEY_SK3". It is up to the smart card driver 214 to interpret what the keys are as long as it is required that these keys be submitted before access is allowed on the files. In one embodiment, the card will do the mapping, but in other embodiments the smart card drivers 214 implement algorithms to provide access protection in the driver.

In other embodiments, certain elements are simulated to provide the desired behavior. However, the application can expect the same behavior regardless of the make or model of smart card. For example, if a particular smart card only provides for one access code, the card-specific driver for that smart card may synthesize three additional access codes to present a consistent access code set to the application 202. Other codes and parameters may be simulated in order to maintain consistency in operation of the smart card module.

In one embodiment, the system creates files that restrict reading of a file with one "logical key" and writing of the file with the same or different "logical key". The smart card-specific driver 214 is responsible for mapping the logical keys into the capabilities of the smart card to provide security. In one embodiment, the system provides at least a predetermined number of access keys and the ability to restrict actions on files (including reading and writing) with those access keys. In one embodiment, the card-specific driver 214 performs a straight mapping of "logical keys" to "physical keys". In another embodiment, the card-specific driver 214 provides logical access protection by various software operations performed in secure systems.

In one embodiment, the smart card module 208 supports the following generic commands:

Smart Card Open,

Smart Card Close,

Submit Pin,

Select a Smart Card File,

Read from a Smart Card File,

Write to a Smart Card File, and

Create a Smart Card File.

Smart Card Open

In one embodiment, the Smart Card Open function is responsible for calling the card reader module 210 to open the communications port, turn on the smart card 160, and return the "answer to reset" value. The "answer to reset" includes information identifying the make and model of the smart card. The "answer to reset" is then parsed and the appropriate smart-card-specific function callout table selected. Remaining smart card module commands call directly into the smart-card-specific drivers 214 via the function callout table.

Figure 5A:
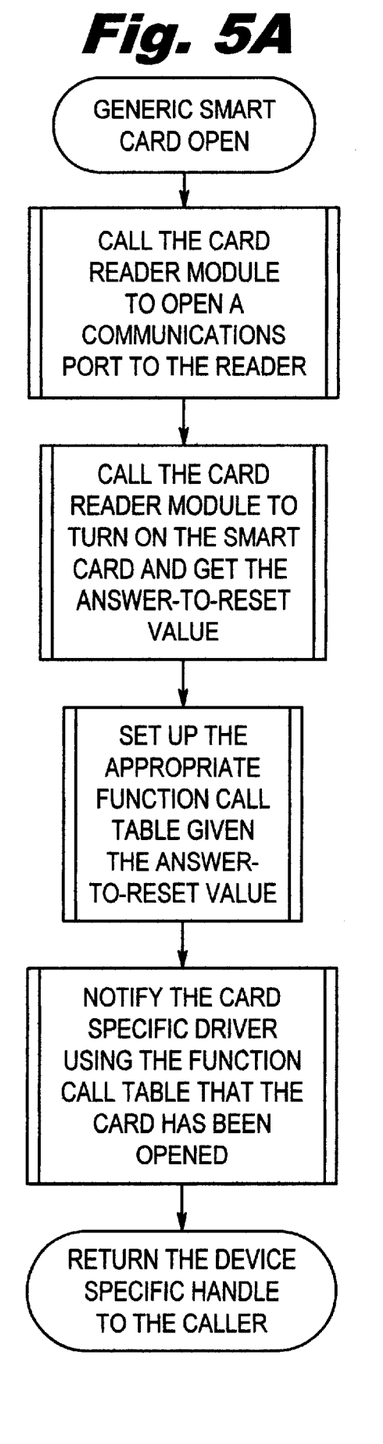
FIG. 5A is a flow diagram of a generic smart card open function according to one embodiment of the present system.

If the open is successful, a smart card module handle is allocated which maintains a reference to the appropriate function callout table, the handle to the card reader module 210, and miscellaneous state information. This handle is returned to the application 202, which in turn passes the handle back to the smart card module 208 in all other smart card module 208 calls. One embodiment is shown in FIG. 5A.

In one embodiment, each card-specific driver 214 provides a callout table which can be selected. In one embodiment, the callout table is a C structure type-defined as smops_t. The card-specific driver makes the callout table available to the main smart card control module for selection during processing of the "answer to reset". Such a structure is further provided in one embodiment discussed in the SMOPS Module Design document, APPENDIX H, which is attached to this document.

Smart Card Close

Figure 5B:
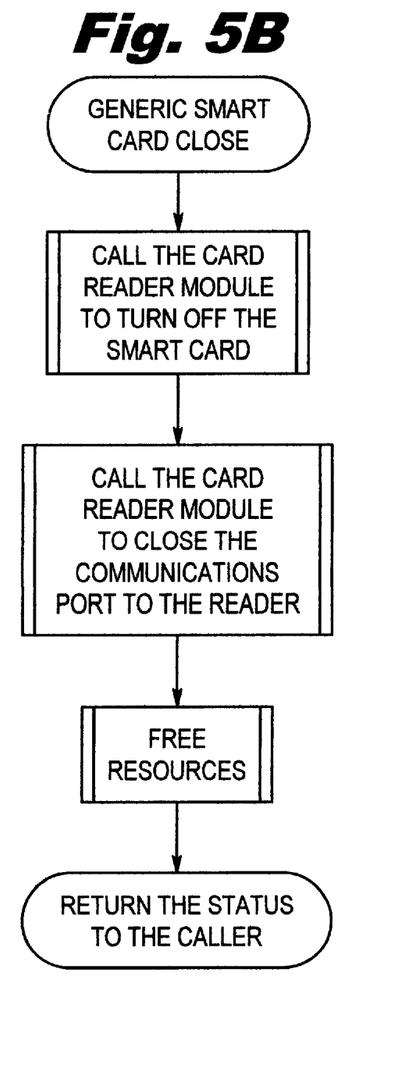
FIG. 5B is a flow diagram of a generic smart card close function according to one embodiment of the present system.

In one embodiment, the Smart Card Close calls the card reader module 210 to power off the smart card 160 and close the communication channel. Once closed, any resources, such as memory, which were allocated during the smart card session are freed, as demonstrated by the flow diagram of FIG. 5B.

Submit PIN

The Submit PIN function creates the byte sequence (smart card command) to submit an access code to the smart card. In one embodiment, the application specifies which of 4 different access codes are to be submitted along with the 8-byte access code itself.

For example, if the smart card 160 is a GEMPLUS MPCOS smart card using access code number one, the command sequence submitted to the smart card 160 via the card reader module 210 is: 0x00, 0x20, 0x00, 0x01, 0x08, followed by the 8-byte access code.

Figure 5C:
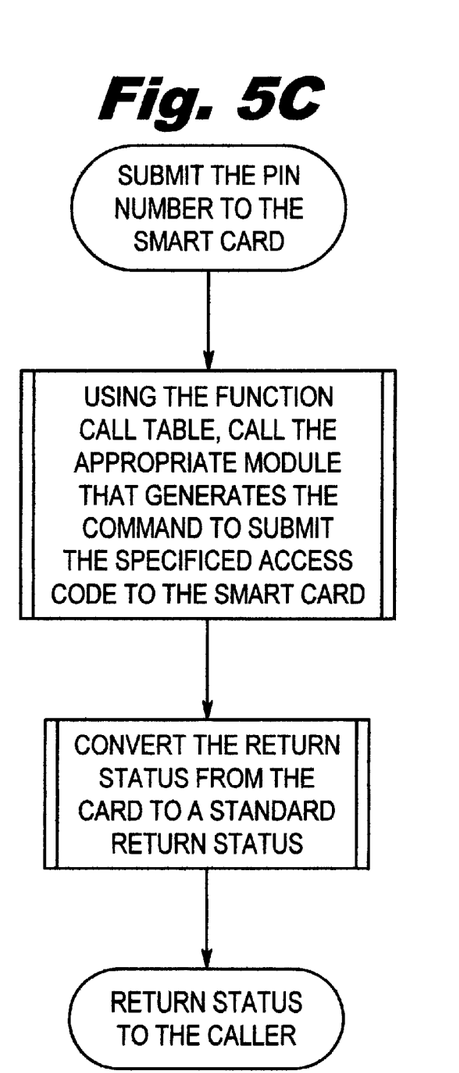
FIG. 5C is a flow diagram of a submit PIN number to smart card function according to one embodiment of the present system.

After the command is submitted to the card 160, the smart card's response is converted to an appropriate error code, which is returned to the caller, such as application 202. One embodiment of the Submit PIN function is shown in the flow diagram of FIG. 5C.

Select a Smart Card File

In one embodiment, the Select Smart Card File function creates a byte sequence (smart card command) to select a file on the smart card 160 according to a reference number of file. The select function returns a "file descriptor" which can then be used by the application 202 for "read" and "write" function calls.

The Select command provides the ability to "select first" and "select next" on a given reference number. The files will be selected in the order in which they are created. Although many smart cards do not allow for the expansion of files, the ability to "select next" allows the application to treat multiple smart card files of a given reference number as contiguous blocks of a single logical file.

For example, if the smart card 160 is a GEMPLUS MPCOS smart card using access code number one, then the command sequence submitted to the smart card 160 via the card reader module 210 is: 0x00, 0xA4, Ref Hi, Ref Lo, 0x02 where "Ref Hi" and "Ref Lo" are the file reference number. Since MPCOS does not provide "select next" functionality, the low byte of the MPCOS reference number is used to sequence the smart card files. A "select first" will return the file with the low byte of the reference number equal to zero, the first select next will use a low byte of one, etc.

Figure 5D:
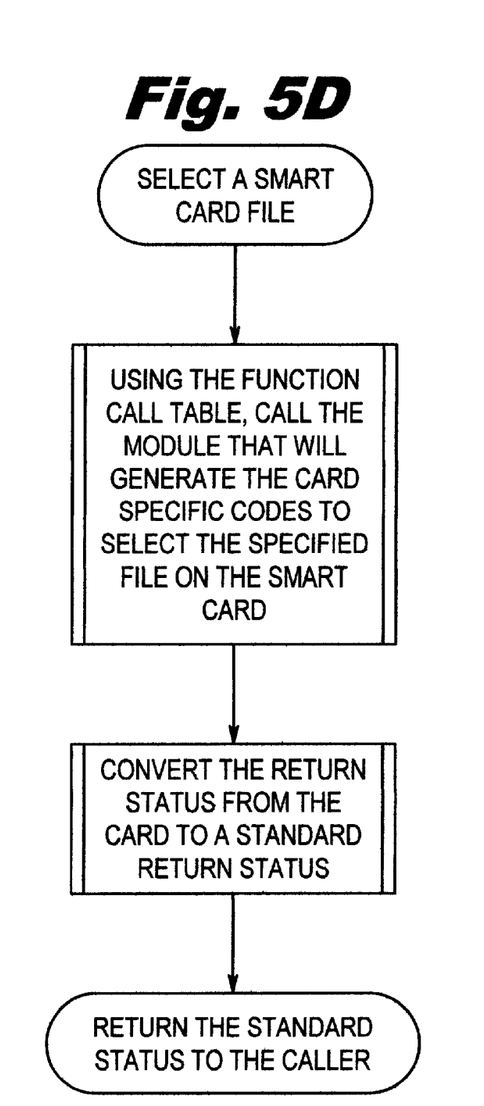
FIG. 5D is a flow diagram of a select smart card file function according to one embodiment of the present system.

As demonstrated in FIG. 5D, after submitting the command to the card 160, the smart card's response is retrieved and converted to an appropriate error code that is returned to the application 202.

Read from a Smart Card File

In one embodiment, the application 202 supplies the descriptor returned from the "Select Smart Card File", the offset from which to start reading, the number of bytes to be read, and a memory buffer to store the data. Prior to reading from the file, however, the application 202 must have submitted the required access code, if any, as defined during the file creation process. The card-specific "Read Smart Card File" function uses the file descriptor handle to identify the particular smart card file from which to read.

For example, if the smart card 160 is an MPCOS smart card, which requires that the file be selected immediately before reading, the MPCOS-specific "Read File" function will re-issue a select command using information stored in the file descriptor and then issue an MPCOS byte string to invoke a read. The byte string for a read on an MPCOS card is: 0x00, 0xb0, Offset Hi, Offset Lo, Size.

Figure 5E:
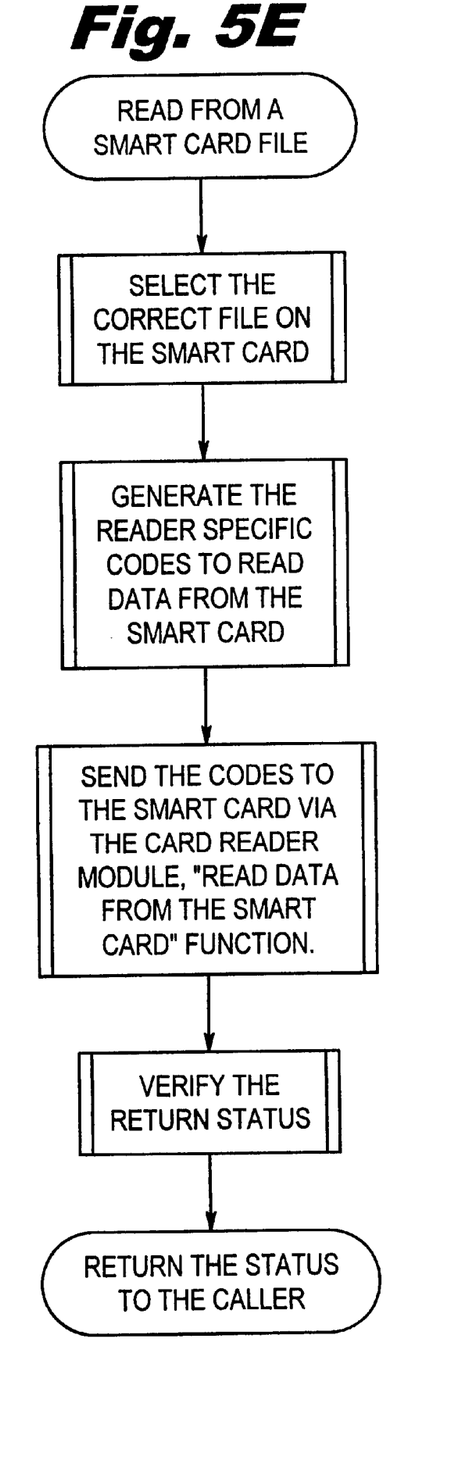
FIG. 5E is a flow diagram of a read from smart card file function according to one embodiment of the present system.

After issuing the command, the Read function reads the response from the smart card 160, which includes the data that was read from the file along with the two byte smart card status code. One embodiment of the Read from Smart Card File function is shown in FIG. 5E.

Write to a Smart Card File

In one embodiment, the application 202 supplies the descriptor returned from the "Select Smart Card File", the offset from which to start reading, the number of bytes to be write, and a memory buffer containing the data. Prior to writing to the file however, the application must have submitted the required access code, if any, as defined during the file creation process.

Figure 5F:
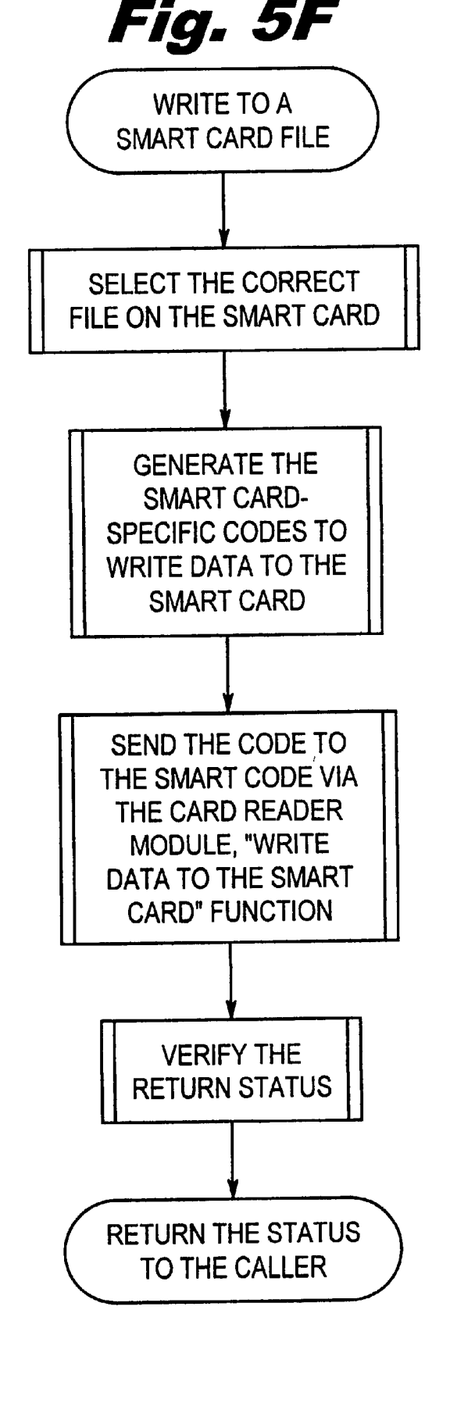
FIG. 5F is a flow diagram of a write to smart card file function according to one embodiment of the present system.

The card-specific "Write Smart Card File" function uses the file descriptor handle to identify the particular smart card file from which to read. One embodiment of the Write to Smart Card File command is shown in FIG. 5F.

In an example where the smart card 160 is an MPCOS smart card, which requires that the file be selected immediately before writing, the MPCOS-specific "Write File" function will re-issue a select command using information stored in the file descriptor and then issue an MPCOS byte string to invoke a write. The byte string for a read on an MPCOS card is: 0x00, 0xd6, Offset Hi, Offset Lo, Size plus the data to write.

After issuing the command, the Write function reads the status response from the smart card 160, converts the response to a standard error code and returns the error code to the application 202.

Create a Smart Card File

Figure 5G:
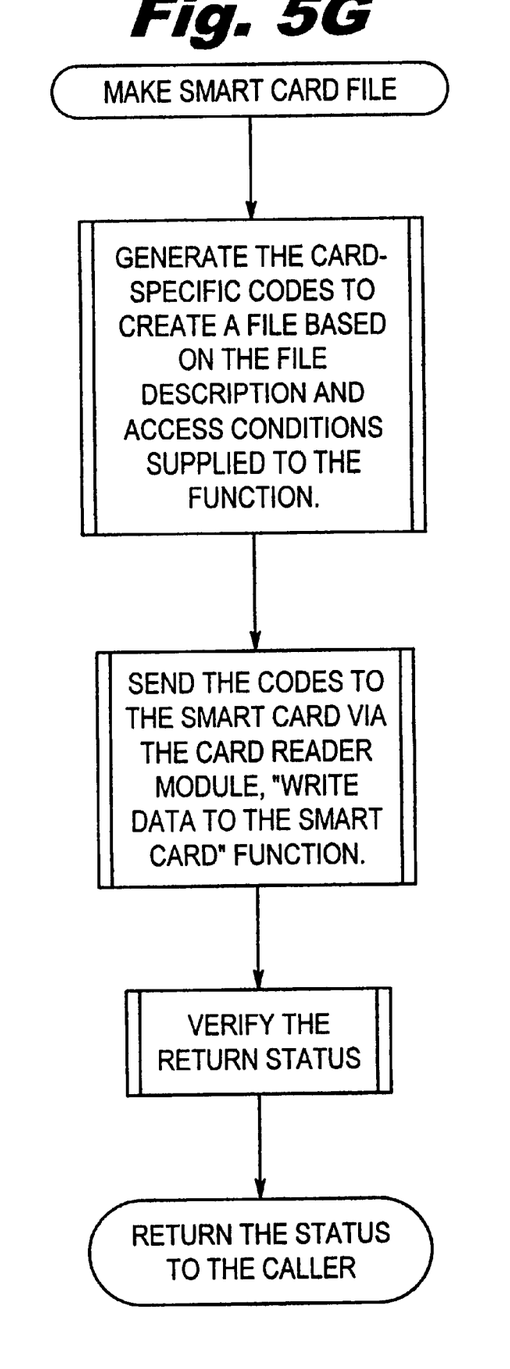
FIG. 5G is a flow diagram of a make smart card file function according to one embodiment of the present system.

In one embodiment, the Create Smart Card File function, shown in FIG. 5G, uses a description of the file supplied by the application to allocate a new file on the smart card 160. The file description includes the file reference number and information to indicate what access code is required for reading, and what access code is required for writing.

In one example the smart card 160 is an GEMPLUS MPCOS smart card. Under MPCOS the file description is converted into a file header as defined in the GEMPLUS MPCOS-3DES Reference Manual, Ver. 1.0, May 1996, which is incorporated by reference in its entirety. The access code conditions are mapped into the MPCOS header file. MPCOS uses a two-byte file reference number to identify files. The function uses the high order byte of the reference number to identify the file and the low byte of the file to identify the sequencing for "select next" commands. The first file created will have a low byte equal to zero, the next equal to one, etc.

Examples of Card Modules and Card-Specific Drivers

One embodiment of a card module 208 is provided in APPENDIX C. This card module is written in the C and C++ programming languages. In this embodiment, the card module 208 invokes card-specific drivers 214, such as provided in APPENDIX D, which is for a GEMPLUS MPCOS card. This particular card-specific driver 214 is specially programmed to translate generic commands received by the access interface 206 into native commands for the GEMPLUS MPCOS card. To support other cards 160, other drivers 214 are written to translate the generic commands into native instructions. For example, APPENDIX F provides a card-specific driver 214 for a GEMPLUS GPCOS card. In other embodiments, additional card-specific drivers are provided for supporting additional cards.

Those skilled in the art who read and understand the present system will understand that other embodiments using different languages and performing different functions exist which do not depart from the present system. And the embodiments and examples given herein are intended to demonstrate the invention and not in and exhaustive or exclusive sense.

Applications In Secure Transactions

The present access system has a multitude of applications in secure transactions, such as secure file transfer and identification of users. One application, for example, is the access control/cryptographic system of PCT patent application Ser. 97/02047, filed Feb. 7, 1997, claiming the benefit of U.S. Provisional Patent Application 60/011,635, filed Feb. 14, 1996, the specifications of which are incorporated by reference in their entirety in this patent application. The card reader operations module (CROPS) from those applications may incorporate the card reader module 210 of the present system and its associated card reader-specific drivers 212. Additionally, the smart card operations module (SMOPS) from the identified applications may use the smart card module 208 of the present system and its associated smart card-specific drivers 210. Such a system provides access control/cryptographic functionality with a plurality of different smart cards and smart card readers. Other embodiments are possible and the examples given herein are intended in a demonstrative and nonexclusive sense.

Additional Applications

The present access system may be used in any application involving multiple cards and/or card readers. The applications include, but are not limited to, door locks, health care, transportation, kiosk, point-of-sale, electronic access control and authentication, such as in computer password systems. Other applications exist and these applications are not exhaustive or exclusive, and are provided to demonstrate only some of the many applications of the present system.

What is claimed is:

1. A computerized smart card access system, comprising:
a card reader software module programmed to support smart card accesses between an application and a selected card reader of a plurality of diverse card readers, the card reader software module programmed upon receiving an instruction identifying the selected card reader.

2. The smart card access system of claim 1, wherein the instruction includes a port identifier for identifying a port communicating with the selected card reader.

3. The smart card access system of claim 1, further comprising a smart card module.

4. The smart card access system of claim 3, wherein the smart card module is programmed to identify a selected smart card of a plurality of smart cards.

5. The smart card access system of claim 3, wherein the smart card module comprises a file access interface providing a common set of file access commands.

* * * * *